United States Patent
Kawakatsu

[19]
[11] Patent Number: 5,843,595
[45] Date of Patent: Dec. 1, 1998

[54] BATTERY HOLDER ATTACHMENT STRUCTURE

[75] Inventor: Minoru Kawakatsu, Tokyo, Japan

[73] Assignee: Mitsumi Electric Co., Ltd., Tokyo, Japan

[21] Appl. No.: 681,355

[22] Filed: Jul. 23, 1996

[30] Foreign Application Priority Data

Jul. 28, 1995 [JP] Japan .................................. 7-212466

[51] Int. Cl.[6] .................................................. H01M 2/10
[52] U.S. Cl. .......................... 429/97; 429/100; 220/326
[58] Field of Search ............................. 429/96, 97, 98, 429/99, 100, 159, 163, 164, 170; 220/324, 326

[56] References Cited

U.S. PATENT DOCUMENTS

| | | | |
|---|---|---|---|
| 4,784,926 | 11/1988 | Sato | 429/96 |
| 4,828,744 | 5/1989 | Yabe et al. | 429/27 |
| 4,842,966 | 6/1989 | Omori et al. | 429/96 |
| 5,039,580 | 8/1991 | Mori et al. | 429/97 |
| 5,188,912 | 2/1993 | Katoh et al. | 429/96 |
| 5,193,220 | 3/1993 | Ichinohe et al. | 455/89 |
| 5,552,240 | 9/1996 | Derstine | 429/96 |

*Primary Examiner*—Stephen Kalafut
*Attorney, Agent, or Firm*—Whitham, Curtis & Whitham

[57] ABSTRACT

A battery holder attachment structure in which a battery holder for holding a button-type battery is provided with a flexible and elastic tongue-shaped portion having a locking projection, and a casing body to which the battery holder is removably attached has a fitting opening portion so that the locking projection is fitted into the fitting opening portion from below so as to be locked therein, and a locked state of the locking projection is released by inserting a coin or the like into the fitting opening portion from above to press the locking projection.

6 Claims, 2 Drawing Sheets

BATTERY HOLDER ATTACHMENT STRUCTURE

BACKGROUND OF THE INVENTION

1. Field of the Invention

The present invention relates to an attachment structure of a battery holder for holding a button-type battery, which is removably attached on a casing body of an AV equipment remote controller or the like, and particularly relates to such an attachment structure in which the button-type battery is locked so as not to be taken out easily by an infant, a baby, or the like.

2. Related Art

FIGS. 3A and 3B show an example of the conventional battery holder attachment structure, wherein FIG. 3A is a top view and FIG. 3B is a side sectional view. An illustrated battery holder 10' is U-shaped roughly so as to be removably attached into a casing body 1' of a remote controller. The battery holder 10' is constituted by a base portion 11 and a pair of right and left holding portions 12 and 12. The base portion 11 has a locking recess portion 13 formed on this side when viewed from the draw-out direction of the battery holder 10' so as to be utilized as a handle at the time of attachment and removal of the battery holder 10'. The holding portions 12 and 12 are projected forward from the opposite end portions of the base portion 11 and have arcuate mount portions 15 and 15 on which a button-type battery 50 can be mounted.

A flexible and elastic tongue-shaped portion 16 having a locking projection 17 projected upward is provided at the central portion of the base portion 11. Semicircular locking concave portions 14 and 14 are formed in the holding portions 12 and 12 in their front end outside edge portions respectively.

The casing body 1', on the other hand, is provided with upper and lower tray-like casings 2 and 3. An attachment portion 5 is provided between the casings 2 and 3 so that the holding portions 12 and 12 of the battery holder 10' can be inserted into the attachment portion 5 so as to be held therein. In the attachment portion 5, a fitting recess portion 7 is formed in the upper casing 2 in its lower surface on this side when viewed from the draw-out direction of the battery holder 10' so as to be fitted onto the locking projection 17 of the elastic tongue-shaped portion 16. Fitting convex portions 6 and 6 each of which is semicircular in section are projected inward from the inner opposite sides of the attachment portion 5 so as to be engaged with the locking concave portions 14 and 14 formed in the holding portions 12 and 12 respectively.

In the thus configured attachment structure of the battery holder 10', a button-type battery (for example, a lithium battery) 50 is mounted on the mounting portions 15 and 15 provided on the holding portions 12 and 12 respectively, and then the battery holder 10' is inserted into the attachment portion 5 of the casing body 1'. At that time, the holding portions 12 and 12 of the battery holder 10' are slightly bent inward so that the locking concave portions 14 and 14 are fitted onto the fitting convex portions 6 and 6 of the casing body 1' respectively, while the elastic tongue-shaped portion 16 is slightly bent downward and the locking projection 17 is fitted into the fitting recess portion 7 of the casing body 1' to complete the attachment of the battery holder 10' to the casing body 1'.

Thereafter, when the battery holder 10' is to be removed from the casing body 1' for the purpose of replacing the battery by a new one or the like, the battery holder 10' is drawn out backward, for example, by a nail or the like hooked in the locking recess portion 13 of the base portion 11 of the battery holder 10'. At that time, the holding portions 12 and 12 and the elastic tongue-shaped portion 16 are bent so that the respective fit-locked states between the locking concave portions 14 and 14 and the fitting convex portions 6 and 6 and between the locking projection 17 and the fitting recess portion 7 are released. Thus, the battery holder 10' having the button-type battery 50 mounted thereon is completely drawn out so as to be removed from the casing body 1'.

The battery holder can be relatively easily drawn out so as to be removed from the casing body in the conventional battery holder attachment structure as described above. Although this fact means that battery exchange or the like can be easily performed without taking a long time and much labor, there is a possibility that an infant, a baby, or the like, may unintentionally draw out the battery holder while fingering a remote controller. There is therefore a possibility of occurrence of an accident that an infant, a baby, or the like, swallows a button-type battery mounted on the battery holder.

In order to surely prevent occurrence of such an accident as described above, therefore, a strong demand exists for a battery holder attachment structure in which a battery holder cannot be drawn out from a casing body by an infant or baby who may swallow a button-type battery, while the battery holder can be relatively easily drawn out of the casing body by any person other than infants.

SUMMARY OF THE INVENTION

The present invention has been accomplished to solve the foregoing problem and an object thereof is to provide such a battery holder attachment structure that an infant, a baby or the like cannot draw a battery holder out of a casing body, while any person other than infants, babies, or the like, can relatively easily draw the battery holder out of the casing body.

In order to attain the foregoing object, according to an aspect of the present invention, in a battery holder attachment structure, a battery holder for holding a button-type battery is provided with a flexible and elastic tongue-shaped portion having a locking projection, and a casing body to which the battery holder is removably attached has a fitting opening portion so that the locking projection is fitted into the fitting opening portion from below so as to be locked therein, and a locked state of the locking projection is released by inserting a coin or the like into the fitting opening portion from above to press the locking projection.

In such configuration, when the battery holder is to be drawn out, one is required to insert a coin or the like from above into the fitting opening portion formed in the casing body to thereby downwardly press the locking projection provided on the elastic tongue-shaped portion of the battery holder so as to release the locked state of the locking projection. In this case, such an operation to insert a coin or the like into the fitting opening portion to thereby press the locking projection downward cannot be thought of by an infant, a baby, or the like, and therefore any infant, a baby, or the like cannot draw the battery holder out of the casing body. A person other than infants, babies or the like can relatively easily draw the battery holder out of the casing body only if the person reads a notice described in the instructions attached to the battery holder or the like.

BRIEF DESCRIPTION OF THE DRAWINGS

FIGS. 1A and 1B show an embodiment of the battery holder attachment structure according to the present invention, wherein FIG. 1A is a partial plan view showing a state where a battery holder is drawn out of a casing body, and FIG. 1B is a side view of FIG. 1A;

FIGS. 3A and 3B show an example of the conventional battery holder attachment structure, wherein FIG. 3A is a partial plan view showing a state where a battery holder is drawn out of a casing body, and FIG. 3B is a side view of FIG. 3A.

DETAILED DESCRIPTION OF THE PREFERRED EMBODIMENT

Figure 1:
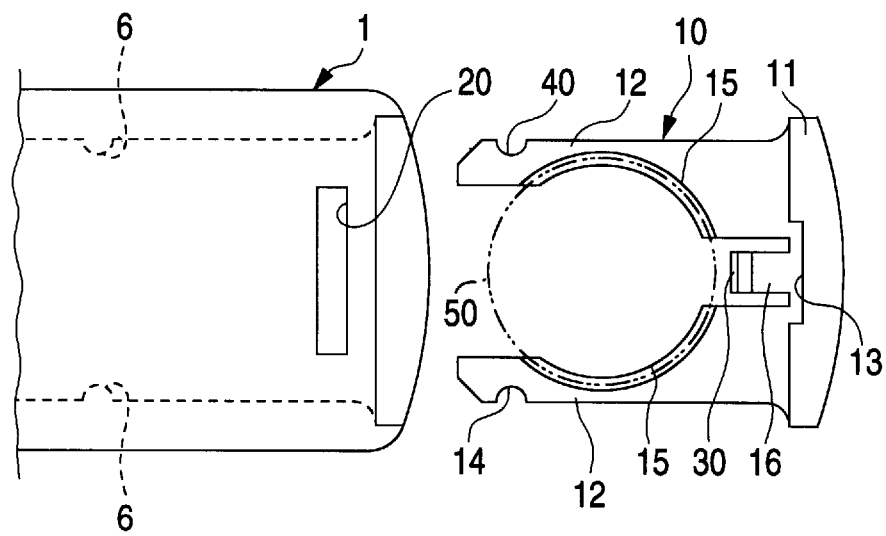
Figure 1:
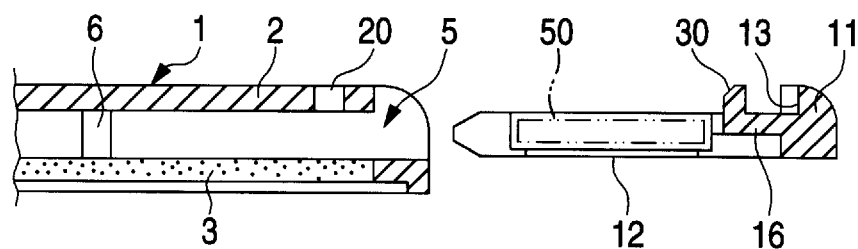

Next, referring to the drawings, an embodiment of the present invention will be described.

FIGS. 1A and 1B show an embodiment of the battery holder attachment structure according to the present invention, wherein FIG. 1A is a top view and FIG. 1B is a side sectional view. An illustrated battery holder 10 is U-shaped roughly so as to be removably attached into a casing body 1 of a remote controller. The battery holder 10 is constituted by a base portion 11 and a pair of right and left holding portions 12 and 12. The base portion 11 has a locking recess portion 13 formed on this side when viewed from the draw-out direction of the battery holder 10 so as to be utilized as a handle at the time of attachment and removal of the battery holer 10. The holding portions 12 and 12 are projected forward from the opposite end portions of the base portion 11 and have arcuate mount portions 15 and 15 on which a button-type battery 50 can be mounted.

Figure 3:
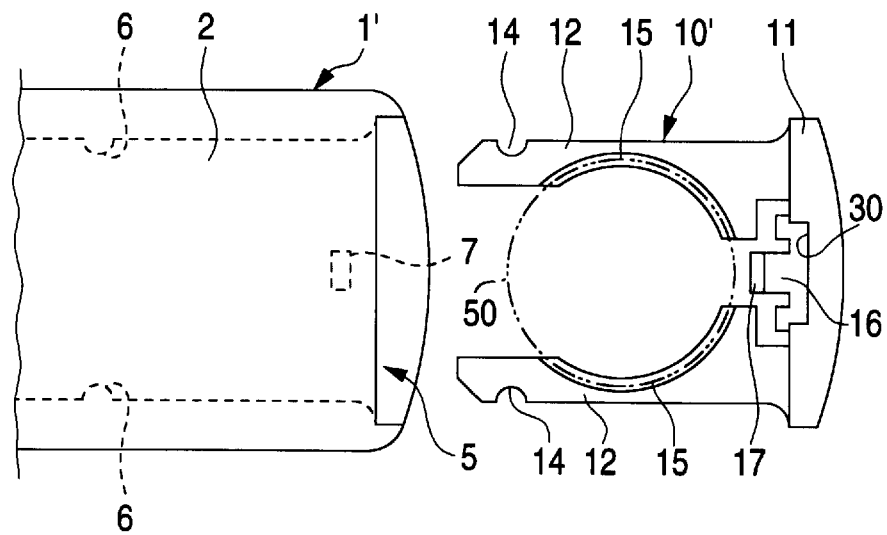
Figure 3:
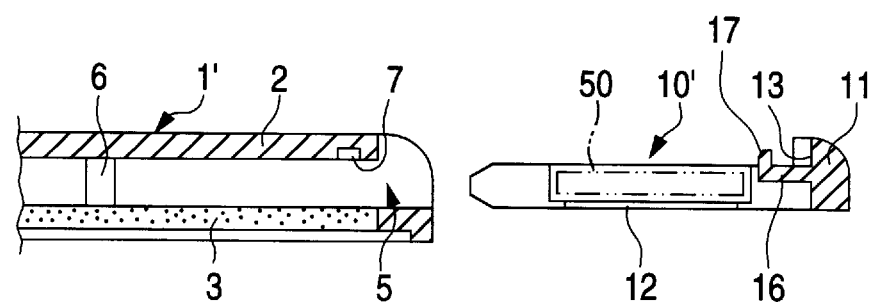

A flexible and elastic tongue-shaped portion 16 having a locking projection 30 which is projected so as to be higher than the conventional one (17 in FIG. 3B) is provided at the central portion of the base portion 11. Semicircular locking concave portions 14 and 14 are formed in the holding portions 12 and 12 in their front end outside portions respectively.

Similarly to the conventional example, the casing body 1, on the other hand, is provided with upper and lower tray-like casings 2 and 3. An attachment portion 5 is provided between the casings 2 and 3 so that the holding portions 12 and 12 of the battery holder 10 can be inserted into the attachment portion 5 so as to be held therein. Fitting convex portions 6 and 6 each of which is semicircular in section are projected inward from the inner opposite sides of the attachment portion 5 so as to be engaged with the locking concave portions 14 and 14 formed in the holding portions 12 and 12 respectively.

In this embodiment, in the attachment portion 5, a slit-like fitting opening portion (e.g., a through-hole) 20 is provided in the upper casing 2 on this side when viewed from the draw-out direction of the battery holder 10 so that a locking projection 30 of the elastic tongue-shaped portion 16 is fitted into the fitting opening portion 20 from the under side so as to be locked therein. The fitting opening portion 20 has a width and a length so that at least a part of a coin (a ten-yen coin or the like) can be inserted into the fitting opening portion 20.

When a coin or the like is thus inserted from above into the fitting opening portion 20, the locking projection 30 fitted in and locked in the fitting opening portion 20 is pressed downward by the coin or the like so that the elastic tongue-shaped portion 16 is bent downward to thereby release the locked state between the locking projection 30 and the fitting opening portion 20.

In the thus configured attachment structure of the battery holder 10, a button-type battery (for example, a lithium battery) 50 is mounted on the mounting portions 15 and 15 provided on the holding portions 12 and 12 respectively, and then the battery holder 10 is inserted into the attachment portion 5 of the casing body 1. At that time, the holding portions 12 and 12 of the battery holder 10 are slightly bent inward so that the locking concave portions 14 and 14 are fitted onto the fitting convex portions 6 and 6 of the casing body 1 respectively, while the elastic tongue-shaped portion 16 is slightly bent downward and the locking projection 30 is fitted into the fitting opening portion 20 of the casing body 1 to complete the attachment of the battery holder 10 to the casing body 1.

Figure 2:
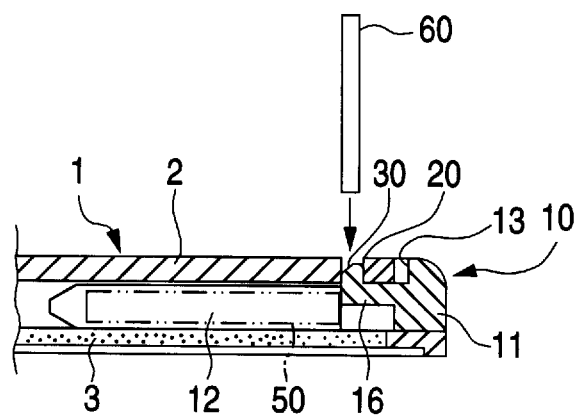
FIG. 2 is a partial side view showing a state where the battery holder according to the embodiment of FIG. 1 is attached to the casing body.

Thereafter, when the battery holder 10 is to be removed from the casing body 1 for the purpose of replacing the battery by a new one or the like, as shown in FIG. 2, a coin or the like is inserted from above into the fitting opening portion 20 so as to downwardly press the locking projection 30 fitted and locked in the fitting opening portion 20 to bend the elastic tongue-shaped portion 16 downward. Then, the battery holder 10 is led out backward, for example, by a nail or the like hooked in the locking recess portion 13 of the base portion 11 of the battery holder 10 under the state where the locking projection 30 has been pushed out downward from the fitting opening portion 20.

Then, similarly to the conventional example, both the fitted and locked states between the locking concave portions 14 and 14 and the fitting convex portions 6 and 6 are released and between the locking projection 30 and the fitting opening portion 20 are released, and the battery holder 10 on which the button-type battery 50 is mounted can be drawn out so as to be removed from the casing body 1.

In this case, an infant, a baby, or the like, cannot think of such an operation to insert a coin 60 or the like into the fitting opening portion 20 to thereby press the locking projection 30 downward, and therefore cannot draw the battery holder 10 out of the casing body 1. Accordingly, such a serious situation that an infant, a baby, or the like, may unintentionally draw out the battery holder while fingering a remote controller does not occur, and such an accident that an infant, a baby, or the like, swallows a button-type battery 50 mounted on the battery holder 10 can be surely prevented from occurring.

Further, a person other than infants, babies or the like can relatively easily draw the battery holder out of the casing body only if the person reads a notice described in the instructions attached to the battery holder or the like.

As understood by the foregoing explanation, in the battery holder attachment structure according to the present invention, there are effects that such a serious situation that an infant, a baby, or the like, may unintentionally draw out the battery holder while fingering a remote controller can be prevented and such an accident that an infant, a baby, or the like, swallows a button-type battery 50 mounted on the battery holder 10 can be surely prevented from occurring. Further, a person other than infants, babies or the like can relatively easily draw the battery holder out of the casing body.

What is claimed is:

1. A battery holder attachment structure, comprising:
   a battery holder, for holding a button-type battery, provided with a flexibly elastic tongue-shaped portion having a locking projection; and
   a casing body to which said battery holder is removably attached, wherein said casing body includes a fitting opening portion for receiving said locking projection therein from below, such that said locking projection is locked therein.

2. A battery holder attachment structure, comprising:

a battery holder, for holding a button-type battery, provided with a flexibly elastic tongue-shaped portion having a locking projection; and a casing body to which said battery holder is removably attached, said casing body including a through-hole for receiving said locking projection from below so as to lock said locking projection therein.

3. The battery holder attachment structure according to claim 1, wherein said battery holder includes a base portion integrally formed with said tongue-shaped portion.

4. The battery holder attachment structure according to claim 3, wherein said base portion includes a locking recess portion for leading out said battery holder from said casing body when said locking projection is unlocked from said fitting opening portion.

5. The battery holder attachment structure according to claim 2, wherein said battery holder includes a base portion integrally formed with said tongue-shaped portion.

6. The battery holder attachment structure according to claim 5, wherein said base portion includes a locking recess portion for leading out said battery holder from said casing body when said locking projection is unlocked from said through-hole.

* * * * *